April 18, 1950     J. F. PAVNICA     2,504,445
BUILT-IN TOASTER UNIT FOR ELECTRIC RANGES
Filed April 15, 1947     2 Sheets-Sheet 2
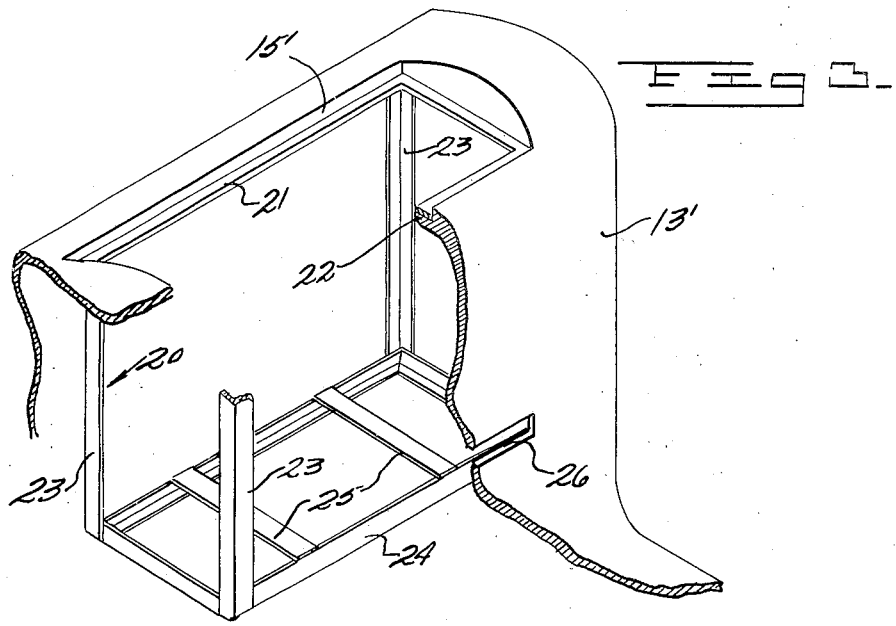
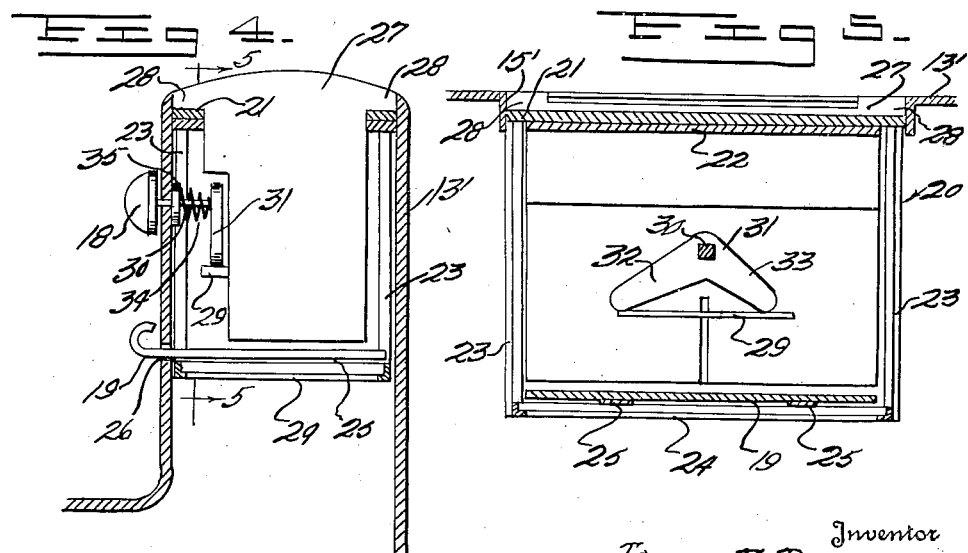
Inventor
JOSEPH F. PAVNICA
By McMorrow, Berman & Davidson
Attorneys Patented Apr. 18, 1950

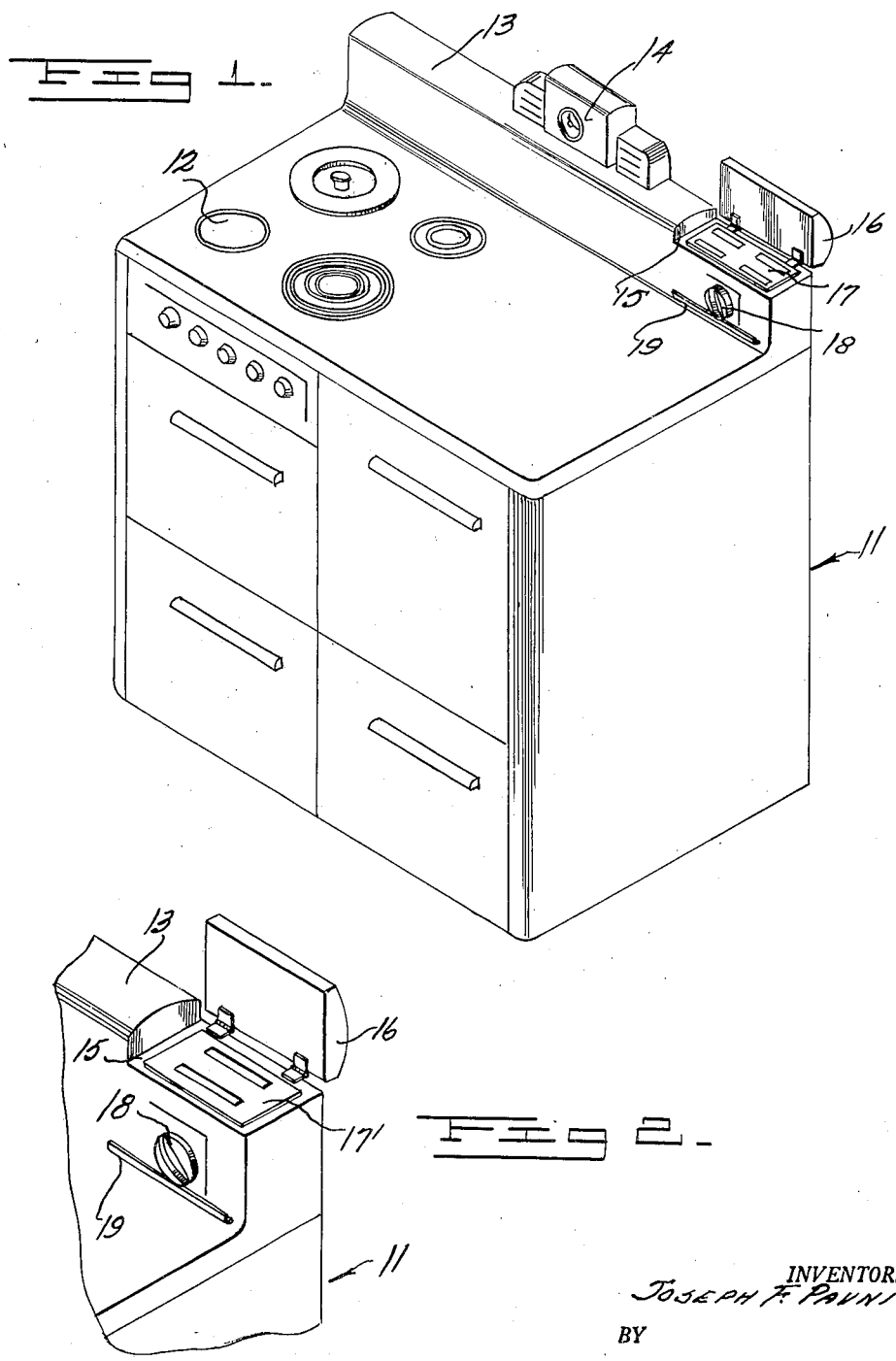

2,504,445

UNITED STATES PATENT OFFICE 2,504,445

BUILT-IN TOASTER UNIT FOR ELECTRIC RANGES

Joseph F. Pavnica, Joliet, Ill.

Application April 15, 1947, Serial No. 741,669

2 Claims. (Cl. 219—19)

1

This invention relates to kitchen ranges, and more particularly to a built in bread toaster for an electric range.

A main object of the invention is to provide a novel and improved bread toaster device adapted to be incorporated in a kitchen range, said device being very simple in structure, neat in appearance and easy to remove for cleaning.

A further object of the invention is to provide an improved toaster device which may be inexpensively incorporated in an electric range, which is simple to operate and easy to maintain in repair.

Further objects and advantages of the invention will become apparent from the following description and claims, and from the accompanying drawings, wherein:

Figure 1 is a perspective view of an electric range incorporating one form of bread toaster in accordance with the present invention.

Figure 2 is a fragmentary detail view of a portion of an electric range showing another form of toaster incorporated therein according to this invention.

Figure 3 is an enlarged fragmentary perspective view showing a supporting frame for supporting a removable bread toaster in an electric range in accordance with another form of this invention.

Figure 4 is a vertical transverse cross-sectional detail view showing a toaster unit removably supported in the frame structure of Figure 3.

Figure 5 is a detail cross-sectional view taken on line 5—5 of Figure 4.

Referring to the drawings, 11 designates an electric range of generally rectangular shape and provided with a plurality of conventional burners 12. At the rear of the range and rising therefrom is a longitudinal hollow ridge 13 on the central portion of which may be mounted an electric clock such as shown at 14. At the right side of ridge 13, as viewed in Figure 1, there is provided a recess 15 having a hinged cover 16 which in closed position is flush with ridge 13. Mounted in recess 15 and depending into the hollow body of the ridge 13 is a four-slice toaster unit 17 of conventional construction. Toaster unit 17 has a control knob 18 projecting from the front surface of ridge 13 and is provided with a removable crumb tray 19 adapted to receive burnt crumbs and the like from the toaster unit 17.

As shown in Figure 2, the toaster unit, herein designated as 17', may be of the two-slice type instead of a four-slice type.

Figures 3, 4 and 5 illustrate an embodiment of my invention wherein the hinged top closure is omitted from the toaster portion of the range. In Figure 3 the top ridge or housing at the rear of the range is designated at 13'. The end portion of the ridge is formed with a rectangular recess or opening 15', and secured therein is a depending rectangular frame, shown generally at 20. Frame 20 has a rectangular top portion 21 which is supported on and secured to underlying inwardly projecting lugs, such as 22 formed in the ridge shell. Secured to top portion 21 are angled depending corner post members 23 and secured to the bottom ends of said corner post members is a bottom inwardly flanged rectangular frame portion 24. Secured to said bottom frame portion are transverse flat strips 25, 25. The front wall of the ridge 13' is formed with a horizontal slot 26 through which the crumb tray 19 is adapted to slide, said crumb tray being supported on said flat strips 25, 25 when it is in its innermost position.

The toaster unit, designated at 27 is formed with shoulders 28, 28 adapted to rest on the top frame portion 21, said toaster unit being removable from the recess 15' by lifting it vertically. The toaster unit is of conventional design and has a vertically movable setting bar 29. To place the toaster in operation, bar 29 is depressed and has suitable thermostatically controlled internal locking means for latching the bar in two different depressed positions, one of which affords a more intense toasting action than the other. Pivoted in the front wall of ridge 13' is a shaft 30 carrying at its outer end the control knob 18. At its inner end shaft 30 carries a forked cam member 31 which has two depending angled arms 32 and 33 engaging the setting bar 29. When the knob 18 is rotated in one direction the setting bar 29 is depressed to one of its operating positions and when the knob is rotated in the opposite direction the setting bar is depressed to its other operating position. The shaft 30 is free to rotate so that when the thermostatically controlled release means of the toaster unit becomes unlatched at the end of a desired toasting period, the bar 29 rises to its normal position. By conventional structure, not shown, this also raises the bread slices partly out of the toaster, so that the completion of the toasting operation is thus signified.

A coiled spring 34, encircles shaft 30 and bears between cam member 31 and a slidable washer 35 on shaft 30. Spring 34 biases the shaft 30 toward its innermost position wherein cam member 31 overlies the setting bar 29. When it is desired to remove the toaster unit from the recess 15', knob 18 is pulled outwardly, whereby the cam member 31 is moved forwardly out of overlying relation with respect to the setting bar 29, thus providing clearance for the upward removal of the toaster unit. The toaster unit may thus be easily removed for cleaning or servicing. To replace the unit the reverse procedure is followed, namely, the knob 18 is pulled outwardly to provide clearance for downward movement of the setting bar 29 past the cam member 31.

Although the toaster unit above disclosed has been specifically described in connection with a kitchen range it may be also employed in a gas or other kitchen range by providing a suitable line cord for the toaster-unit, which may be plugged into any convenient electric outlet.

While certain specific embodiments of a kitchen range incorporating an electric toaster unit have been disclosed in the foregoing description, it will be understood that various modifications within the spirit of the invention will occur to those skilled in the art. Therefore it is intended that no limitations be placed on the invention other as defined by the scope of the appended claims.

What is claimed:

1. In a bread-toaster, a housing provided with an opening in its top, a frame positioned within said housing and dependingly carried by the top of the latter, a toaster unit supported within said frame and mounted for movement into and out of the open top of said housing, a horizontally disposed setting bar arranged within said frame operatively connected to said toaster unit and mounted for vertical movement for controlling the degree of toasting of bread, a horizontally disposed rotatable shaft extending through the front wall of said housing, a cam member carried by the inner end of said shaft and in engagement with the setting bar for moving the latter in response to rotation of said shaft, means on the outer end of said shaft for rotating the latter, said shaft and cam member being outwardly shiftable and away from said setting bar to permit insertion and removal of the toaster unit, and resilient means circumposed on said shaft and operatively connected to said housing and said cam member for biasing said cam member into engagement with said setting bar.

2. A bread toaster, comprising a housing having an opening in its top, a support frame mounted within the housing, a toaster unit supported within said frame and mounted for substantially vertical movement into and out of the open top of said housing, a generally horizontal setting bar arranged within said frame and operatively connected with said toaster unit and mounted for vertical movement for controlling the degree of toasting of bread, a substantially horizontal rotatable shaft extending through the front side of said housing, a cam member carried by said shaft near the inner end thereof and arranged in engagement with the setting bar for moving the latter in response to rotation of said shaft, said cam member including spaced diverging arms of different lengths, the outer end of each arm engaging the setting bar upon opposite sides of said rotatable shaft so that rotation of the shaft in different directions will impart a different degree of movement to said setting bar, a knob mounted upon the outer end of said shaft for rotating the same, said shaft and cam member being outwardly shiftable as a unit and away from the setting bar to permit insertion and removal of the toaster unit, and resilient means mounted upon said shaft and operatively connected to said housing and said cam member and serving to bias cam member into engagement above said setting bar.

JOSEPH F. PAVNICA.

REFERENCES CITED

The following references are of record in the file of this patent:

UNITED STATES PATENTS

| Number | Name | Date |
| --- | --- | --- |
| 1,606,037 | Myers | Nov. 9, 1926 |
| 1,963,409 | Johnson | June 19, 1934 |
| 1,989,933 | Kahn | Feb. 5, 1935 |
| 2,221,870 | Kahn et al. | Nov. 19, 1940 |
| 2,321,850 | Pearce | June 15, 1943 |
| 2,356,649 | Bucher | Aug. 22, 1944 |